(12) United States Patent
Phipps et al.

(10) Patent No.: US 8,894,772 B2
(45) Date of Patent: Nov. 25, 2014

(54) RELATEING TO PIPELINE PIGS (71) Applicant: Cokebusters Ltd., Chester (GB)

(72) Inventors: John Phipps, Cheshire (GB); Hugh Lewis, Oxfordshire (GB)

(73) Assignee: Cokebuster Ltd., Chester (GB)

( * ) Notice: Subject to any disclaimer, the term of this patent is extended or adjusted under 35 U.S.C. 154(b) by 0 days.

(21) Appl. No.: 13/866,395

(22) Filed: Apr. 19, 2013

(65) Prior Publication Data

US 2013/0276828 A1 Oct. 24, 2013

(30) Foreign Application Priority Data

Apr. 20, 2012 (GB) .................................. 1206940.7

(51) Int. Cl.
- *B08B 9/04* (2006.01)
- *B08B 9/055* (2006.01)
- *G01M 3/00* (2006.01)
- *F16L 55/26* (2006.01)
- *G01M 3/24* (2006.01)

(52) U.S. Cl.
CPC ............ *B08B 9/0551* (2013.01); *B08B 9/0557* (2013.01); *G01M 3/005* (2013.01); *F16L 55/26* (2013.01); *G01M 3/246* (2013.01)
USPC ............... 134/8; 134/6; 134/22.1; 134/22.11; 134/22.12; 134/22.18; 134/42; 73/623; 15/104.001; 15/104.03; 15/104.05; 15/104.061

(58) Field of Classification Search
CPC .... B08B 9/055; B08B 9/0551; B08B 9/0552; B08B 9/0553; B08B 9/0554; B08B 9/0557
USPC ......... 134/6, 8, 22.1, 22.11, 22.12, 22.18, 42; 73/623; 15/104.001, 104.03, 104.05, 15/104.061
See application file for complete search history.

(56) References Cited

U.S. PATENT DOCUMENTS 646,545 A  4/1900  Novotny
929,110 A  7/1909  Reeser
(Continued)

FOREIGN PATENT DOCUMENTS

EP  0282687  *  9/1988
EP  1172155 A2  1/2002
(Continued)

OTHER PUBLICATIONS

Potentially Related Patent, U.S. Appl. No. 12/235,928, filed Sep. 28, 2008, Patent No. 8,491,722.

(Continued)

*Primary Examiner* — Bibi Carrillo
(74) *Attorney, Agent, or Firm* — The Dobrusin Law Firm, P.C.

(57) ABSTRACT

An intelligent pig for pipeline monitoring comprises a single body containing signal transmitters and receivers provided with replaceable rings for centering the body within the pipeline, the rings may be provided with brushes which help center the pig within the pipeline and also aid its passage through pipelines which may contain bends and/or be of variable diameter, the pig may be used in combination with a cleaning pig to provide combined activities using a common driving force.

20 Claims, 4 Drawing Sheets

(56) References Cited

U.S. PATENT DOCUMENTS

| | | | |
|---|---|---|---|
| 1,228,447 A | 6/1917 | Koenig | |
| 3,220,455 A | 11/1965 | Sowko | |
| 3,323,572 A | 6/1967 | Farah | |
| 3,426,822 A | 2/1969 | Trendowski | |
| 3,651,530 A | 3/1972 | Schultz | |
| 3,717,927 A | 2/1973 | Smith | |
| 3,837,386 A | 9/1974 | Lejeune | |
| 3,987,831 A | 10/1976 | Wakrave et al. | |
| 4,016,620 A | 4/1977 | Powers | |
| 4,077,079 A | 3/1978 | Knapp | |
| 4,122,575 A | 10/1978 | Sagawa | |
| 4,242,771 A | 1/1981 | Knapp | |
| 4,244,073 A | 1/1981 | Sagawa | |
| 4,267,217 A | 5/1981 | Brooker | |
| 4,361,488 A | 11/1982 | White et al. | |
| 4,406,031 A | 9/1983 | Eimer et al. | |
| 4,413,370 A | 11/1983 | Payne et al. | |
| 4,720,884 A | 1/1988 | Ralls | |
| 4,919,180 A | 4/1990 | Linden | |
| 5,088,336 A * | 2/1992 | Rosenberg et al. | 73/865.8 |
| 5,090,079 A | 2/1992 | Allison et al. | |
| 5,150,443 A | 9/1992 | Wijnberg | |
| 5,150,493 A | 9/1992 | Sivacoe | |
| 5,384,929 A | 1/1995 | Smith | |
| 5,433,236 A | 7/1995 | Zollinger et al. | |
| 5,533,224 A | 7/1996 | Knapp | |
| 5,797,993 A * | 8/1998 | Woehleke | 134/8 |
| 5,924,158 A | 7/1999 | Watts | |
| 6,500,271 B1 | 12/2002 | Moore et al. | |
| 6,792,641 B1 * | 9/2004 | Laker | 15/104.061 |
| 6,814,115 B2 | 11/2004 | Ostrovskis | |
| 7,032,636 B2 | 4/2006 | Sakajari | |
| 7,111,516 B2 * | 9/2006 | Bazarov et al. | 73/623 |
| 7,421,914 B2 * | 9/2008 | Stanley et al. | 73/865.8 |
| 8,491,722 B2 | 7/2013 | Phipps | |
| 2002/0011124 A1 | 1/2002 | Phipps | |
| 2005/0072237 A1 * | 4/2005 | Paige et al. | 73/623 |
| 2009/0078283 A1 * | 3/2009 | Phipps | 134/8 |
| 2009/0165227 A1 | 7/2009 | Phipps | |
| 2010/0205757 A1 * | 8/2010 | Munden | 15/104.061 |
| 2011/0167914 A1 * | 7/2011 | Sutherland | 73/643 |
| 2012/0118085 A1 * | 5/2012 | Christie | 73/865.8 |

FOREIGN PATENT DOCUMENTS

| | | |
|---|---|---|
| EP | 2039440 A1 | 3/2009 |
| GB | 2379258 A | 3/2003 |
| JP | 05/096261 A1 | 4/1993 |
| WO | 95/35172 A1 | 12/1995 |
| WO | 98/37990 A1 | 9/1998 |
| WO | WO2009/156862 A2 * | 12/2009 |

OTHER PUBLICATIONS

Potentially Related Application, U.S. Appl. No. 12/317,815, filed Dec. 30, 2008, published as 2009/0165227.

UK Office action, Application No. GB1206940.7, mailed Jul. 27, 2012.

* cited by examiner

RELATEING TO PIPELINE PIGS

FIELD

The present invention relates to improvements in or relating to pipeline pigs.

BACKGROUND

The term pig is used to refer to devices that are passed through pipelines or tubing whether for cleaning the pipelines or for monitoring the internal surfaces and thickness of the pipes or tubes. They may also be used for separation of product within the pipe or tube. This invention is particularly concerned with pigs that can be used to inspect pipelines or tubes from the inside to check for deposits and inconsistencies and irregularities in the walls of the pipelines or tubes. Inspection may be performed to assess the need for cleaning and/or pipeline repair or to assess the effectiveness of cleaning and/or repair. The invention further provides an integrated system providing combined activities whereby pipes or tubes can be sequentially cleaned with a cleaning pig and then inspected with a pig in which a common driving force is used to drive both types of pig through the pipelines or tube.

Although the invention is particularly useful with tubing used in oil refinery furnaces for carrying the hydrocarbons that are to be subject to high temperatures, it may also be used in connection with other pipes and tubing.

The tubing systems in refining furnaces such as crude oil distillation, vacuum thermal crackers, visbreakers, delayed cokers and the like typically have a sinusoidal path through the furnace to optimise the exposure of the contents of the tube to the heat; this is frequently referred to as the furnace coil being serpentine. In a typical furnace or process fired heater the product to be treated usually passes through a tube system which may be horizontal or maybe vertical in a downward and upward direction or a combination thereof and in some furnaces the initial section of the tubing consists of an upper closely packed tubing section in which the temperature of the product to be treated is raised to the treatment temperature by convection heating. Typically the pre-heated product then passes down to a lower section of the tubing in which there is more space between the lengths of tubing and in this section the tubes are heated by radiant heat. Typically, in both sections the tubes of a process fired heater consist of straight sections joined by bend sections, which may be semi-circular known as u-bends or may be box headers with (sharp bends) internal sharp 90 degree turns, sometimes referred to as "horseshoes" and/or "mule ears".

In order for efficient and safe operation of such a tubular system it is important that the tubes are periodically cleaned and free from deposits and are also inspected to ensure the walls of the tube are free from undesirable deposits, tube material condition anomalies, wall thinning and/or various forms of metallurgic degradation. Inspections have been performed on line through furnace viewing windows and/or during furnace shut down through use of a variety of manual techniques used on the cleaned external surface of the tube walls. All these methods have limitations of usefulness as well as being time consuming and costly.

Additionally, where a furnace contains closely packed tubing such as is usually the feature of the higher level convection section, visual and manual inspection of tubes is impossible.

Accordingly it may be necessary to replace that section of the tubing according to the lifetime warranty provided by the supplier which can result in unnecessary replacement of tubing and also unnecessary and costly downtime of the furnace.

The inspection of the tube or piping may be performed sequentially after the cleaning of the internal surface of the tube or piping. Traditionally furnace process tubes have been cleaned/decoked using the method known as 'steam air decoking'. More recently, since the mid 1990's, mechanical decoking or pig decoking has gained in favour in oil refineries around the world, widely replacing the practice of 'steam air decoking'. Mechanical decoking is carried out by driving an abrasive or scraper pig through the pipe or tube to scrape deposits from the internal surface of the pipe or tube. This can be accomplished by driving the abrasive pig through the tube under fluid pressure such as water pressure. For example a cleaning unit having water tanks and pumps can be driven to a refinery, linked up with the tubing within a refinery furnace to produce a circuit through which the cleaning pig may be driven under water pressure so that the debris obtained by the cleaning operation is removed from the tubing system in the water stream and can be separated from the water for disposal. The cleaning operation may be performed by several runs of the cleaning pig which can be in the same direction or in opposite directions. Currently, after the cleaning operation the tubing system may be inspected in a separate operation.

As previously mentioned it is known to send a pig through a pipeline for the purpose of clearing any blockage therein and for removing unwanted deposits that have formed on the inner wall thereof. Such a device finds application, for example, in the oil industry, especially for cleaning fired heater or furnace tubes in a refinery. Refinery fired heaters may be subjected to temperatures normally in excess of 200° C. and in specialist furnaces temperatures can exceed 700° C. Such conditions lead to the formation of carbonaceous deposits (coke) on the pipeline wall. A pig can then be forced therethrough under pressure of a fluid, for example water, such that the deposits are removed by friction as the pig scrapes along the pipeline wall. U.S. Pat. No. 5,924,158 discloses an exemplary pig suitable for this purpose. The pig may be passed through the pipeline, uni-directionally or bi-directionally, several times to remove the coke. Decoking is carried out after the furnace has been taken out of service and cooled down.

However, the extreme conditions referred to above, usually exacerbated by the pressured flow of crude oil and semi-refined feedstock (oil) through the pipeline, can impose high levels of stress on the pipeline. Furthermore, high temperature refining activity within the furnace leads to separation of crude oil into its component parts, which can lead to corrosion of the tube wall. Decoking which is sometimes carried out by steam or air can also lead to a thinning of the tube wall. Additionally, there may be external corrosion of radiant furnace tubes by localised heat intensity from the furnace burners which can lead to delamination of the tube metal.

Accordingly, regular monitoring of the condition of the tubing is required, to ensure that cleaning and/or decoking has been fully effective, and to ensure that the wall thickness has not been materially degraded by the cleaning or decoking or through the effects of the operation of the furnace in service. If a furnace tube is breached during operation in service this can be extremely dangerous potentially causing life threatening conditions. Similarly if a pipeline is allowed to deteriorate beyond safe limits, this can lead, in extreme cases, to a fracture, with the associated expensive and disruptive unscheduled downtime. Abrupt stoppages can also lead to blockage of the pipeline as the process materials carried thereby cool and increase in viscosity perhaps congealing.

Monitoring of the condition of tubing or a pipeline can be conventionally carried out by radiography, precision monitoring of flow and pressure, thermal imaging or hand held NDT (non-destructive testing). However, each of these techniques has disadvantages. Manual NDT can be time consuming, for example taking 6 or 7 days fully to inspect an entire furnace, and it also requires the furnace tube to be abrasively cleaned on the outer wall to carry out the inspection successfully. Furthermore, a furnace would normally need to be scaffolded internally to enable this work to be carried out, this being disadvantageous in time. Thermal imaging usually looks for hotspots as an indication of contamination although closely packed convection tubing cannot be inspected in this way. Monitoring is carried out whilst the furnace is in operation, and some areas of tube may not be visible from the access windows. Furthermore, the far side of tubes cannot be monitored by this technique.

It is also known to provide a tethered pig with monitoring equipment and to send it through a pipeline, in which operation of the equipment is controlled from outside the pipeline via an umbilical cable, a fibre-optic cable for example, and in which the responses detected by the on-board monitoring equipment are transmitted back along the cable to the external monitoring unit. However, such a monitoring pig is bulky, is not able to be used in pipelines of less than about 6 inches (15 cms) diameter, and is unable to navigate any useful distance through a serpentine tube coil such as will be found in a process fired heater.

European patent application publication EP 2039440 A1 describes a pipeline pig for, and a method of, monitoring a pipeline or tube coil in a convenient and an unmatched time efficient manner. The Pig is referred to as an "Intelligent Pig" abbreviated to "IP" and this will also be used in this application. EP 2039440 A1 further describes how the IP may be introduced into the tubular system following the cleaning operation by substituting the IP for the cleaning pig. This enables the same fluid driving and control system to be used for both the cleaning and inspection operations which is time saving and efficiency improving. This benefit is to some extent derived from the ability of the IP to perform its function without the need to contact clean metal on the internal tube wall. The IP produces an acoustic signal that travels through the fluid and echoes from the hard surface. The IP is able to distinguish between different materials and from interpretation of signals, it is possible to make judgments concerning different materials that may feature on tube wall surfaces.

Accordingly, the IP can be used during the course of the pig decoking and it is only necessary to establish a clear passageway so that the IP can securely pass from end to end.

This combination of pig decoking and pig inspection by the IP enables the IP to find areas where coke remains. This can helpfully and valuably impact on the decoking by guiding the decoking operators to areas where coke contamination remains, at the same time helping them to avoid wasting time running scraper pigs where no coke exists. This combination of decoking and inspection using the same machinery, equipment and manpower as combined activities provides considerable time efficiency.

The IP of EP 2039440 A1 is provided with flexible sleeves which help the IP to pass through a tube coil. This limits the danger of the IP becoming lodged in a tube coil having had its progress interrupted by patches of coke or other contamination.

EP 2039440 provides a pipeline IP for monitoring a pipeline from the interior thereof, the IP comprising an electronics module arrangement, which may be enclosed within an outer casing, wherein the electronics module arrangement comprises a transmitter for transmitting monitoring signals to the wall of the pipeline, a receiver arrangement for receiving transmitted signals returned from the wall of the pipeline, a microprocessor for analysing the received signals, a data logger for storing the data analysed by the microprocessor, and a source of electrical power for supplying the transmitter, receiving arrangement, microprocessor and data logger.

The IP of EP 2039440 is not dependent on a power supply that is external to the pipeline, and is able to analyse and store onboard the results of the monitoring for subsequent downloading when the IP has exited the pipeline. Furthermore the IP can be produced down to a size to allow it to pass through tubes with, for example, a diameter down to 85 mm. Since there is no tethering required for the IP in EP 203944 0, it can conveniently be sent through convoluted pipeline configurations from end-to-end, without the risk of snagging.

The IP of EP 2039440 comprises two sections joined by a universal joint. It contains a tapered nose section provided with sleeves which abut against the interior surface of the pipe to centre the IP in the pipeline and to protect the electronics. An electronics receiver unit is provided which is connected to a transmitter unit by means of the universal joint which helps the IP to pass around bend positions in the pipe. The rear section is provided with a petal sleeve that allows water to flow up against the sleeves at the nose section to drive the IP through the pipeline and it also centres the IP within the pipe.

In the system of EP 2039440 the pig is driven through the tubing system by fluid, preferably water pressure, against the rear section of the pig and the front end of the IP is provided with a tractor sleeve which is a flexible tapered sleeve that captures the driving fluid so that the IP is driven along the tube. The tractor sleeve fits tightly over the casing of the pig which is preferably of stainless steel. The sleeve is dimensioned so that it fits tightly up against the tube inner wall and is designed to provide a flexible 'cup' which seals firmly against the internal tube wall regardless of anomalous imperfections in the internal bore. The sealing effect of the tractor sleeve increases as the fluid pressure increases. The fluid fills the cup and forces the thinner flexible edges into the tube wall perfecting the seal and causing the IP to be controllable and smooth in its running. The fluid is preferably water. The IP is also provided with a rear 'petal' disc to allow water to flood around the acoustic carriage and fill the spaces between the central sections of the IP and the inner walls of the tube or piping and the petals of the disc should sit firmly up against the tube inner wall to ensure a) protection of the acoustic carriage from impact, and b) the centring of the carriage within the tube or pipeline.

Whilst the IP described in EP 2039440 has proved successful for the monitoring of pipes it has been found to suffer from certain disadvantages. Firstly its direction of movement within a pipe is unidirectional and it is not possible to reverse the direction of movement. Secondly there are some difficulties in using the IP of EP 2039440 in narrow bore pipes such as pipes of diameter of 76 mm or smaller and in particular the IP does not pass readily around the bridges at the ends of piping particularly in box headers, and some difficulties are experienced with narrow bore semi-circular sections. Thirdly the IP is heavier than is desired particularly as at times it is required to be driven vertically upwards in the pipes that are to be inspected.

The present invention addresses these disadvantages.

SUMMARY

The present invention therefore provides an intelligent pig comprising a single body comprising a container for a transmitter and a receiver for signals to monitor the interior of a pipe.

The use of an untethered IP with all the components encapsulated within a single body enables more accurate inspection of a wider range of tubes of varying diameters and pathways. Additionally it allows the direction of travel of the IP to be readily reversed. The use of a single body has enabled a reduction in the weight of the IP resulting in smoother flow through the tubes particularly in the vertical direction. The single body is preferably cylindrical and is also preferably substantially symmetrical and provided with a nose section at both ends of the cylindrical body, the symmetry need not be total one or both end sections may be shaped to enable electronic connectors such as a USB. The single body may be fabricated from several components, for example a preferred configuration comprises two end sections between which is sealed a ring of transducers whose surfaces are exposed to the fluid bridging the surface of the transducer and the interior of the tube or pipe. The electronics and power supply may then be contained in compartments within the two end sections on either side of the transducer ring. The transducer ring being sealed in place by an assembly which prevents the fluid entering the body of the IP.

In a preferred embodiment the single body is provided with one or more rings to centralise the IP within the tube or pipe. The rings are preferably provided around the cylindrical section of the cylindrical body and are preferably replacably mounted so that damaged rings can be replaced and different sized rings can be employed according to the internal diameter of the tube or pipe that is to be inspected. The rings form a dual function, they provide a surface against which the fluid pressure that drives the pig through the pipe can bear and they also serve to ensure that the pig remains centrally within the pipe. It is therefore preferred that the rings comprise an inner section for driving the pig provided with protuberance that extend to the inner surface of the pipe and also provide spaces for flow of the driving fluid. Brushes may be employed at the exterior of the rings.

The number of rings employed and their position along the body of the container can be varied although it is preferred to use a plurality of rings symmetrically located along the body of the container we have found that two rings, one at each end of the container or for three or four rings equally spread along the surface of the container is particularly useful. The rings may be of any suitable material, polyurethane or nylon being particularly suitable.

Rings comprising an inner section of a polyolefin such as high density polyethylene provided with nylon brushes are particularly useful.

Where brushes are used the bristle density and length may be selected according to the tube or pipe diameter and the type of furnace being inspected. The brushes and rings are interchangeable to suit the tube or pipe diameter which allows the single body to be used in tubes and pipes of varying diameter. In a preferred embodiment inner and outer rings are provided with the inner rings being provided with shorter bristles providing greater rigidity which improves the alignment of the IP within the tube or pipe which improves the accuracy of the data. Rings with longer bristles may be provided at the ends of the cylindrical body to provide greater flexibility to help passage of the IP through circular or plugged (box header) sections. Brushes with bristles of different lengths may be used if the pipe diameter changes during an inspection. The bristles may be longer and more flexible for the larger diameter sections so that they can be collapsed to pass through smaller diameter sections.

The cylindrical singular body may be of any suitable material that allows the passage of the transmitted and received signals and has sufficient strength to withstand the pressures to which it is subjected within the pipe that it is inspecting, for example water pressures up to 250 psi or higher. It is however useful that the body be lightweight to enable the pig to have a neutral or near neutral buoyancy in order to be readily driven vertically upwards in a pipe that it is inspecting. To achieve this challenging combination of strength, resistance to water ingress and neutral buoyancy, carbon fibre and Kevlar have been found to be particularly useful materials from which to manufacture the cylindrical body. The cylindrical body may be made in one or more sections that can be secured together after provision of the electronics.

In a preferred embodiment the ends of the pig are designed to allow the attachment of nose cones that may be of a size and shape selected according to the pipe or tube in which they are used.

The electronics such as the power supply, circuiting, accelerometers and other electronics are sealed within the single body with the faces of the transducers exposed to the fluid (typically water) bridging the surface of the IP to the interior surface of the tube or pipe being inspected. The transducers are preferably provided with a thread which locks into a threaded ring inside the pig and the transducer unit is provided with a seal assembly to prevent flow of the fluid into the body of the pig. Additionally preferably included in the internal electronics is a humidity sensor so that when the IP is connected to a controlling computer, the humidity sensor can provide an indication of the internal humidity in order to provide confirmation of a dry interior or a warning of water ingress. Although optional such an additional feature provides valuable protection for the complex internal electronics.

Advantageously the signals transmitted by the transmitter within the cylindrical body are acoustic, preferably ultrasonic, signals. Although not preferred it is also envisaged, however, that a laser or radio transmitter may be used. It is preferred that the transmitter comprises a series of pulse sources located around the internal circumference of the single container. The optimum number of transmitters and the frequency of pulsing will depend upon the tubing or piping that is being monitored. However it has been found that up to 32 transmitters may be incorporated in the cylindrical body. In the preferred system there are 16 or 32 transducers, preferably ceramic transducers, which are spaced equally around the interior circumference of the cylindrical body of the IP and each transducer is managed individually. In one embodiment a sequence can start with transducer 1 sending out 8 acoustic pulses. As each pulse recovers three echoes, this action provides data from 24 echoes. Then transducer 2 sends its 8 pulses. Then transducer 3 sends its 8 pulses, and so on until all 16 or 32 have sent their 8 pulses each. That is a sequence and the sequence may then be repeated once. The two full sequences around the 16 or 32 transducers make up a cycle.

In a preferred embodiment the cycle is therefore made up as follows: 32 (transducers)×8 (pulses)×3 (echoes)=768 echoes per cycle. The preferred system involves an option for selecting a quantity of cycles per second. For example, there may be 10 cycles per second in which case each second will produce 7,680 echoes containing measurement data. The controlling system currently allows a gain rate adjustment up to and including 10 times, therefore producing 100 cycles per second in turn giving 76,800 echoes containing measurement data.

The size of the pig and the number of transducers can be selected according to the interior diameter of the tube being inspected. A smaller pig with 16 transducers may be used with tubes of up to 15 cms diameter and a layer pig with 32 transducers may be used with tubes of larger diameter.

A cross sectional image of the tube can be produced by a cycle. Accordingly, with the system previously described there can be from 10 cross section measurements per second up to 100 cross sectional measurements per second. Assuming a typical speed of the IP of 1 meter per second through the pipe or tube this produces a detailed cross sectional tube image every 100 mm or as often as every 10 mm along the length of the pipe or tube. If it is desired to produce more frequent images, the IP can be driven more slowly.

At a speed of travel of 1 meter per second an IP will traverse a typical furnace tube coil of 480 meters end to end in a period of 8 minutes no more than 10. Several runs may be necessary to monitor an entire furnace for example an operation including 4 separated process runs of 480 meters amounting to 1,920 meters in total (approximately 6,300 feet) could be employed. It is preferred to include an accelerometer (or grouping of accelerometers—typically three) within the single body which may be a component of the miniaturised circuits within the IP. The accelerometers within the single body, particularly when centred within the tube by rings enables an accurate identification of the location of the bends within the tubing.

The IP of the present invention allows reversal of the direction of travel of the pig within the tube or piping without the need to remove the pig from the piping system. This provides the distinct advantage that it is possible to make several runs through a tube coil, rather than just one without removing the pig thus avoiding the costs of furnace downtime. The use of the IP therefore balances minimum downtime with valuable data recovered on tube condition. This invention can make valuable use of its time efficiency by making a second and third scanning run. As each run will identify a cross sectional detail every 10 mm to 100 mm (depending on settings), then further runs will provide even more comprehensive coverage. If a run takes approximately 10 minutes, and allowing for the time to download the collected information a complete coil scan takes less than 25 minutes. This opens up the opportunity to conduct more scans without costing extra time. This is especially true when the IP scan can take place by interrupting the decoke cleaning operation for a short time such as 10 minutes—then whilst the scan download is carried out the decoking can proceed. This time efficiency is achieved through the combined activities of decoking and inspection performed together, in harmonious control.

A further advantage provided by the easy forward and reverse controlled action of this invention is the ability to conduct scanning runs in fired heaters which contain tubing of varied sizes. This is typically the case in Vacuum Distillation Fired Heaters, but can include other types. Accordingly, the IP can be driven along tubing of a diameter such as 20 cms (8 inches) as far as the reducer to the tubing of the next size which would likely be 15 cms (6 inches). At the reducer the IP can be stopped and reversed back to the launcher where it can be withdrawn for downloading. An alternative method would be for the IP to continue from 20 cms (8 inches) through into the 15 cms (6 inches) by compressing the outer brushes, then stopping at the next reduction, typically 12.5 cms (5 inches) to 10 cms (4 inches), to be reversed to the launcher for removal.

The electronics within the IP comprise an emitter arrangement and a receiver arrangement. The emitter sends out signals to the inner and outer surfaces of the walls of the tube or piping and these are bounced back from the internal and external surfaces of the walls of the tube to the receiver arrangement. Knowing the speed of travel of the signal through the media that separates the emitter and the receiver from the walls of the tube the internal diameter and thickness of the wall of the tube can be calculated from the time difference between the receipt of the two signals.

The IP preferably uses piezo-electronic transducers in single or dual plate. In common with many devices of this type, either hand held or in other bodied forms, the acoustic pulse is transmitted from the transducer and its echoes are recovered, in this case the echoes are referred to as E1 and E2, along with a third and less important deteriorating echo typically identified as E3.

The E1 echo is the pulse hitting the hard inner surface of the tube wall and bouncing back to the transmitting transducer. The time taken is measured and calculated against the known speed of sound through the medium. For example the speed of sound in fresh water is known to be 1482 m/s at 20C. Using the recorded time taken to recover the sonic echo, it is therefore a simple calculation to find the distance traveled. Adjustment can be made to allow for half the diameter of the transducer carriage to provide the inner tube radius as the result. This measurement can be added to that of the opposing transducer to calculate the tube diameter at that point.

The E2 echo is the recovery of the echo from the outer wall of the tube. Approximately 80% of the energy in the original pulse is echoed back from the hard surface of the tube inner wall. The remaining energy of the pulse continues through the tube wall and produces a measurable echo bouncing back from the outer tube wall surface.

The recovery of this echo presents a further and relatively simple calculation. The time taken for the E1 transmission and recovery is deducted from the E2 in order to isolate the time taken for the pulse to travel through the tube wall from internal to external hard surface.

This time can be calculated against the known speed of sound through the material of the tube wall to produce a thickness measurement. These features of acoustic technology are widely known and in varied use within specialist industrial practices.

This system provides two particular benefits which allow the recovery and presentation of valuable data concerning the state of the tube or pipeline.

1. The pulse will echo off the hard surface of the tube inner wall to provide E1. This hard surface may not necessarily be the perfectly clean tube wall and could be carrying remaining internal surface contamination. Unlike many inspection devices the IP of the present invention sends its sonic pulse to the tube walls through a fluid medium, typically water. It is not necessary for the acoustic transducer or sensor to touch the tube wall and, in fact, this is undesirable. The pulse travels through the fluid and hits the hard surface to echo back to the transducer. A measurement is therefore produced which is not dependent upon the tube surface being perfectly cleaned to it its material surface.
2. There is a further echo which is known here as the E3. For recovery and interpretation of this echo the IP uses particular software to produce useful data from what may be termed as the "deteriorating echo".

E3 is actually a second repeating echo derived from the first echo E1.

The first echo E1 returns from the internal tube wall and is received onto the transducer for storage and analysis of its information. A small percentage of the returning echo (E1) bounces off the receiving transducer or IP carriage surface and returns a second time to the tube internal wall. The strength of this echoed pulse is low and it is not moving in a clean straight line. The pulse spreads out from the transducer into a fan of approximately 5 degrees. When this acoustic pulse hits the tube internal wall it does not hit a single point surface so its echo contains comparative information which includes an acoustic 'footprint' of the nature of surface material and its consistency.

The returning information contained in E3 is plottable on a graph where axis 0-X can represent soft to hard material, and axis 0-Y can be smooth to rough and information can be displayed in a manner whereby different colours on the display can identify the various types of tube wall imperfections including the types of corrosion which may be existing in the metallurgy.

A further benefit of the present invention is that the IP can be accessed for programming and diagnostics which allows adjustments to be made to account for the speed of sound in different types of metal. Furnace process tubes are fabricated from a variety of metal types for example, occasionally in low temperature areas standard carbon steel is used; more frequently chrome steel is used, and sometimes stainless steel is employed. Each metal has a slightly different composite density and acoustic speed through each metal is accordingly slightly different. It is therefore (possible) desirable to identify types of steel and make the necessary adjustment to the IP in order to maintain accuracy.

The receiver arrangement in the electronics of the IP may comprise an analogue receiver for receiving the returned signals and an associated digital receiver arranged to convert the analogue signals into digital form and to send the digital signals to the microprocessor.

Thus, the digital receiver may conveniently comprise an analogue-to-digital converter. The power source preferably comprises a battery preferably a lithium ion battery which typically provides an 8 hour life and the electronics module arrangement advantageously comprises a charging circuit for a rechargeable battery pack which is integrated with the IP. For example, the battery may provide up to 2 hours operating time within the pipeline, and the module arrangement may be provided with a fast re-charger for maximum efficiency of usage of the IP.

The IP of the present invention, with its self-contained onboard electronics can conveniently be sent bi-directionally through small bore and serpentine tubing and/or pipelines, and the information gathered thereby can subsequently be downloaded and reviewed by the operator usually after the IP has exited the pipeline. The monitoring may be carried out subsequent to a decoking operation to determine its effectiveness, and/or may be carried out at other times, for example on a regular basis, so that a process engineer can establish a clear understanding of developing patterns of characteristics of the tube coil and/or pipeline. In this way erosion of the pipeline can be noted before it occurs to a damaging extent and preventative maintenance can be planned into the normal operation of the pipeline or tube, thereby avoiding undesirable downtime, and enhancing the cost effective management of the refining process, for example. In addition regular tube inspection by this convenient and time efficient method can be archived to produce trends of degradation so that a minimum condition can be confidently forecasted, providing data for the construction of an informed remaining life assessment.

Monitoring of a tube or pipeline in accordance with the present invention can be completed in as little as 25 minutes due to the rapid firing of the acoustics which provide the necessary mass of date. This data can then be sifted at high speed by the controlling software which is able then to present informative displays which are packed with valuable details.

Bespoke and proprietary software is preferably used, and preferably it features an automatic link into a word processing package such as 'ms word' so that an Inspection Report is constructed automatically as the acoustic scanning proceeds. In this way the Inspection Report can be submitted for example in CD or printed form while the specialist equipment for cleaning and monitoring remains at the site where it is being used. This is highly beneficial for the decision making process of the site owner/management in order to determine whether or not the furnace should go back on line or instead to be taken out of service for maintenance.

A particular problem with IP technology, both in cleaning and inspection operations, is the ability to locate the position of the pig within the tubing accurately and consistently. In the present invention the IP is preferably run, operated and controlled by a specialist pumping unit machine which houses a control room including all devices to control fluid flow and pressure. As a further example of the value of combined activities, included in these controls is the bespoke and proprietary software which can identify the location of the IP within the tube or piping and can integrate this information with the tube diameter and wall thickness measurements performed by the IP. The software can also sift through the masses of data to produce an easy to view display to aid in analysis of the results.

Included in the image are all the measurements individually listed along with relevant reference data. Mainly the following three images can be provided:

A coloured general arrangement image of the tube serpentine coil in 2D & 3D.

An x/y axis graph to display internal diameter and wall thickness of tubes against a set central tolerance level.

A cross sectional image (with data) of the tube at a given point in the scan.

This allows a technician viewer to identify areas of anomaly on the general arrangement and tolerance graph parts, then direct attention to that area of concern. From the general arrangement drawing it is possible to simply click on a chosen point to be taken instantly to the cross section of tube at that particular location.

The operation of the system of the present invention can improve both the accuracy and consistency of the determination of location within the tube. Recorded data includes evidence of location taken from a variety of electronic sources including recorded time, accelerometers, pressure/flow recordings, etc. Such gathered information will identify IP location within serpentine tube systems with a typical accuracy of 10 mm to 50 mm.

The management of the speed of movement of the IP within the tube is assisted by using fluid injection machinery which is designed and constructed to incorporate controls and gearing to promote consistent fluid pressure and thus consistent speed of travel of the IP.

The location may also be determined by a pressure signal whereby the IP is run through a tube circuit driven by fluid provided by associated specialist pumping unit machinery.

Differential pressure signals detected in the control of fluid pumping, once accurately filtered and interpreted by proprietary software can provide information on serpentine circuit changes of geometry. Typically, passage of the IP through the 180 degree u-bends will be detected by interpretation of fluid pressure differentials. Once the location of these signals is identified, the information can be integrated with the location by time (and accelerometer) information to provide supporting evidence enhancing the accuracy of the identification of the location of the IP at all times during its journey through the pipe or tubing.

This provides a valuable feature which contributes to the ability of the technical operator to accurately locate the IP and thus identify the position in the tube of a particular measurement.

The software may be used on dedicated laptop computers in the control room of the fluid pumping unit machine. Differential water pressure information may be constantly fed to the computer from, for example, a Rosemount D-1151 Pressure Transmitter, Siemens Sitrans DS111 Transmitter or an Icenta Intelligent Electronic Pressure Switch DS400P. The pressure switch feeds to the computer an accurate signal for example through an armoured cable. The signal gives instantaneous reports of changes in the fluid, usually water, pressure which is driving the IP. Information is displayed on screen rather like a heart monitor, so unrestricted movement of the IP in a straight tube will typically show as a flat line—indicating a uniform pressure.

The pipeline or tube monitoring provided by the present invention may be integrated with the tube cleaning mechanisms which employ a scraping or cleaning pig. For example, a fluid pumping system may be connected up to the tubing system and a scraping or cleaning pig inserted into the launcher and then propelled through the tubing system by means of the fluid pressure. The fluid leaving the tubing system and containing the debris removed by the scraping operation can be observed, the debris removed and the clean fluid recycled. At some stage when the cleaning is substantially complete the fluid leaving the tubing system will become cleaner and contain less debris. At this time the cleaning pig can be replaced with an IP according to the present invention. In this way the same pumping system, fluid supply and control systems can be used for both cleaning and inspection which significantly improves the time efficiency of the operation and reduces furnace down time required for maintenance. With all site crew members being colleagues, operating the same machinery, it is an easy and convenient procedure to consult on changes of cleaning pig and inspection pig to produce the most favourable results.

The system of the present invention (employing the single body) therefore provides the following benefits in addition to those provided by the IP of EP 2039440.

1 The direction of movement of the IP within the pipe can easily be reversed without the need to remove the IP from the piping system.
2 The IP is simple to manufacture.
3 The IP may be of lightweight carbon fibre or Kevlar construction and, with neutral or near neutral buoyancy is more easily driven through piping systems, particularly upward vertical sections of the system.
4 The rings and brush units can be easily and quickly replaced to allow for inspection of tubes of different internal diameters.
5 The compact single bodied unit manoeuvres more easily around bends in piping systems, and allows passage through plugged/box headers which would not likely be possible using a multiple bodied IP.
6 Capability to pass through tube diameters down to 60 mm
7 The single bodied IP can more easily manage varying diameters of tubing within a serpentine coil or pass, such as featured in a vacuum furnace.
8 Significantly improved accuracy of location within serpentine tube system.
9 Protection of internal electronics through humidity sensor.
10 Different nose cones can be attached to the IP according to the size and shape of the pipe or tube that is being inspected.
11 Improved accelerometer data due to smoother movement of the IP through the tubes.
12 Increased battery power for longevity of use, along with increased microelectronic processor power and increased data storage capacity.
13 Significantly increased ultrasound data capture rate for improved measurement frequency as imaged in cross sectional displays per 10 mm.
14 Better central alignment of the IP due to the rings and brushes which results in improved measurement data.

BRIEF DESCRIPTION OF THE DRAWINGS

The present invention is illustrated by reference to the accompanying drawings in which.

DETAILED DESCRIPTION

Figure 1:
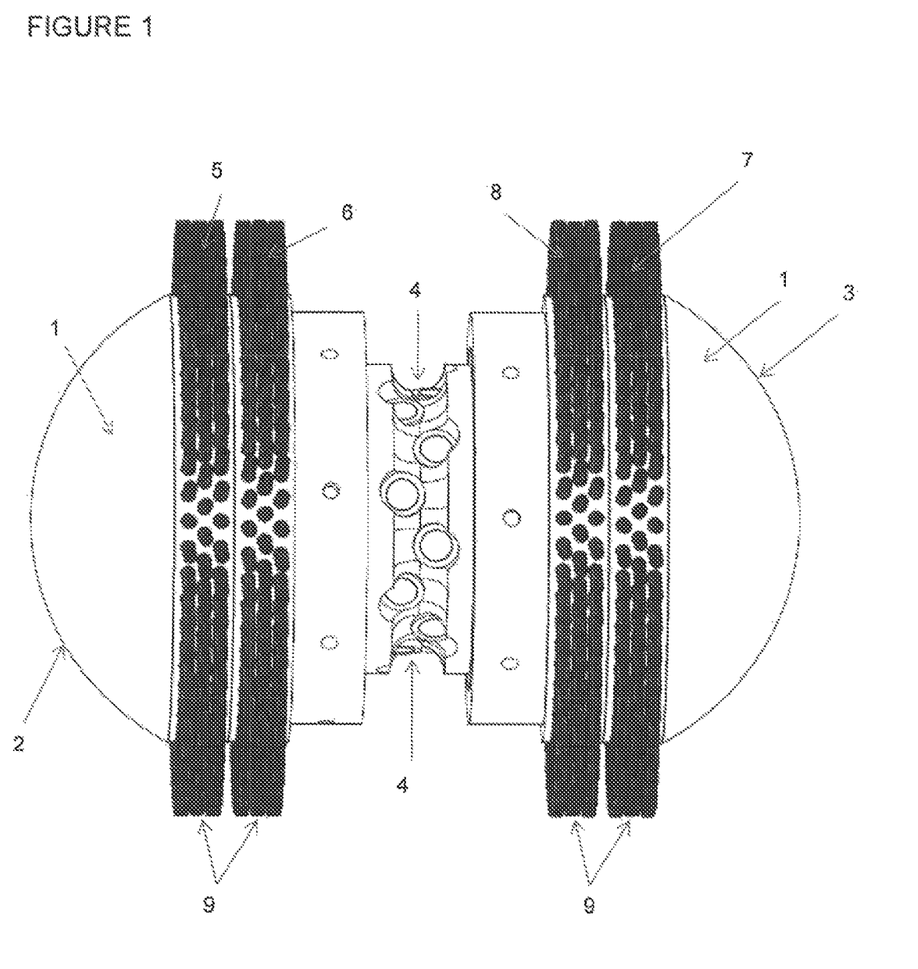
FIG. 1 shows an intelligent pig according to the present invention.

FIG. 1 shows an IP according to the present invention comprising a cylindrical body (1) provided with nosecones (2) and (3) at each end and comprising a ring of 16 transducers (4) and additionally provided with four rings (5), (6), (7) and (8) which in turn are formed with brush bristles (9) at their extremities.

Figure 2:
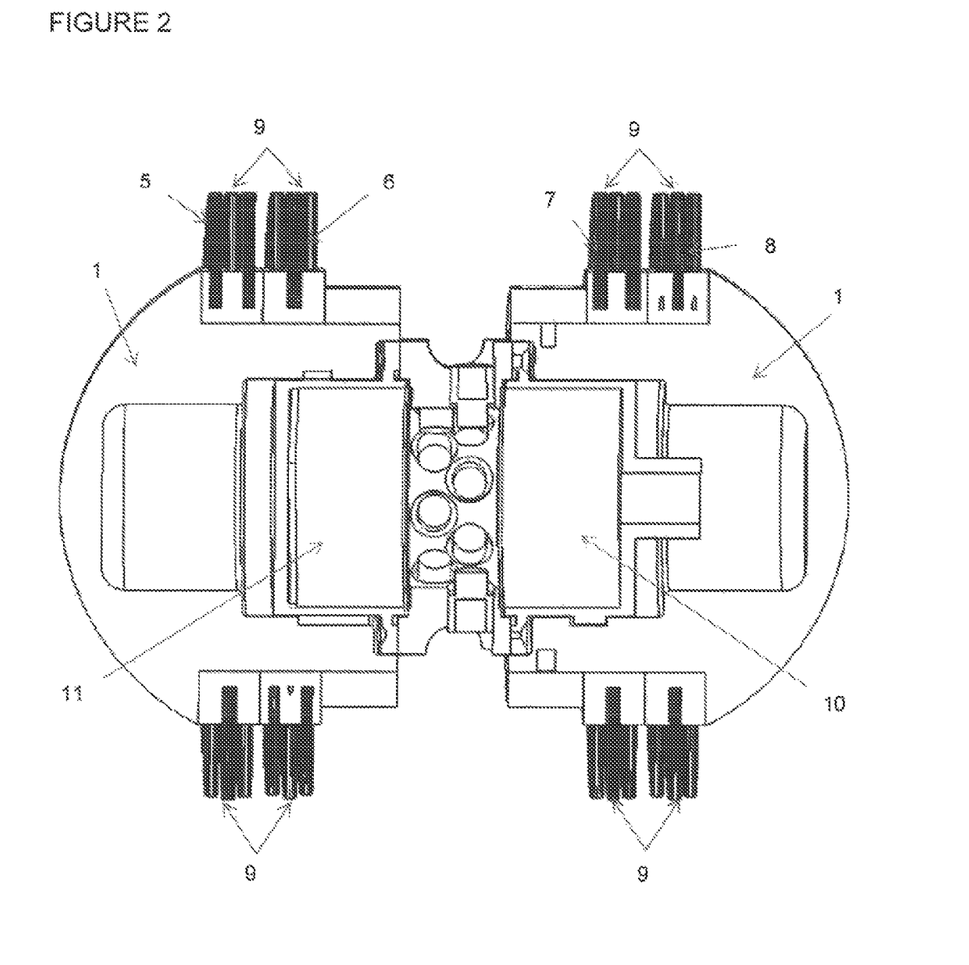
FIG. 2 shows a cross section through A-A of FIG. 1.

FIG. 2 shows a section through the IP shown in FIG. 1 and comprising a cylindrical body (1) made of fibre reinforced epoxy resin containing a ring of 16 transducers (4) and further providing a compartment (10) for the electronics comprising circuit boards containing the circuitry (not shown), accelerometers (not shown) and optionally humidity sensors and thermocouples. An additional compartment (11) is provided for the power supply typically lithium-ion batteries.

Figure 3:
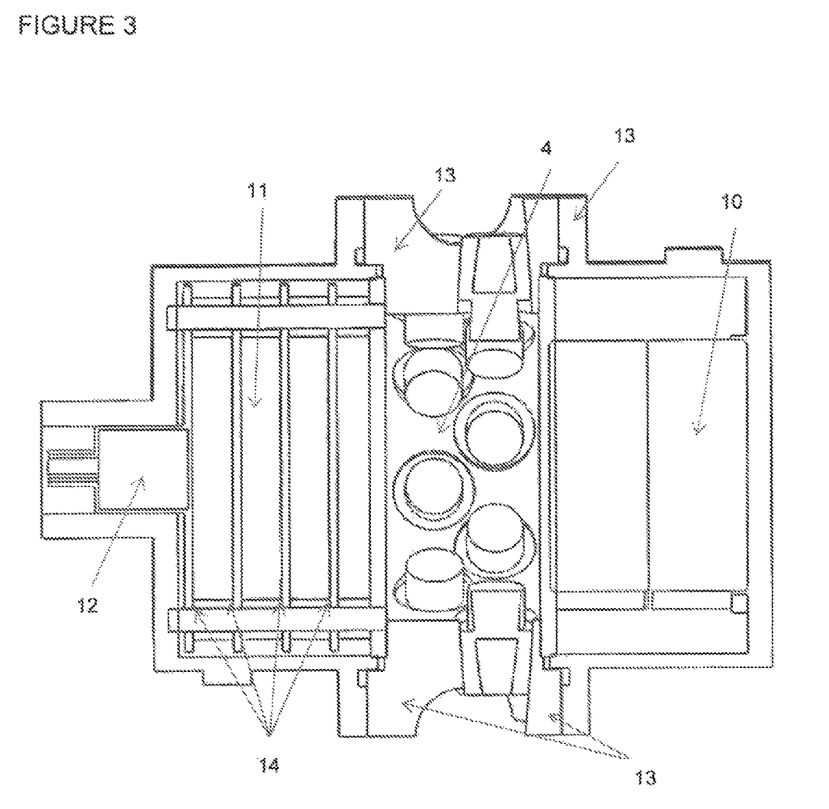
FIGS. 3 and 4 show additional detail of the interior of the IP as shown in FIG. 1.

FIG. 3 shows additional detail for the compartments illustrated in FIG. 2 showing the lithium-ion batteries (14) and shows how a micro USB connector (12) can be provided at one end of the unit. The transducer ring is sealed within the single body by a sealing flange (13).

Figure 4:
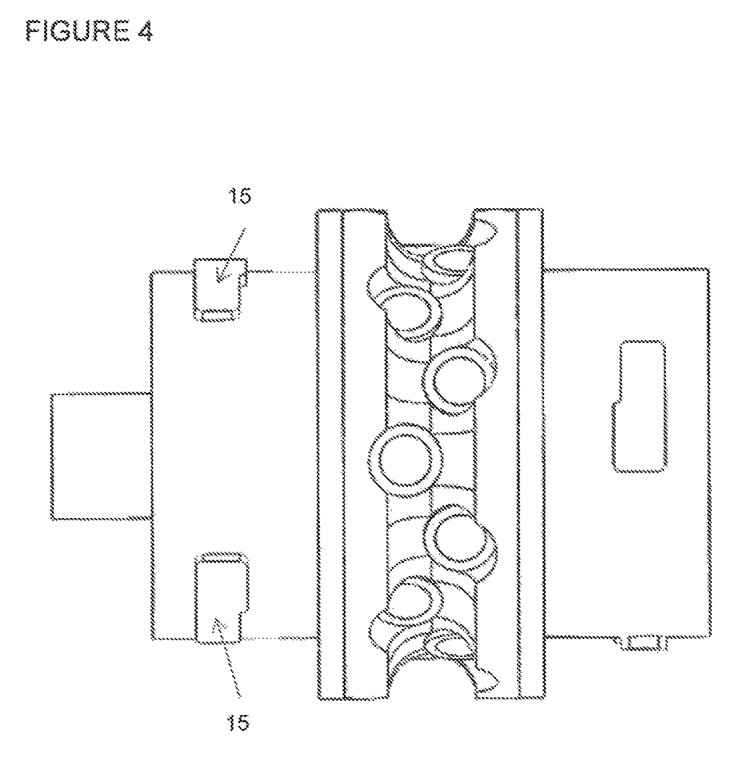

FIG. 4 shows how grooves (15) may be provided in the single body for receipt of the locating rings in a manner that allows them to be replaceable.

We claim:

1. An intelligent pig comprising:
  a single body comprising:
    a) a shell having two end sections that create the single body;
    b) a transmitter located within the single body, the transmitter emitting signals;
    c) a receiver located within the single body, wherein the receiver receives signals from the transmitter so that the transmitter and the receiver monitor an interior of a tube or a pipe; and
    d) a power supply located within the single body;
  wherein the transmitter includes a ring of transducers that are sealed within an interior portion of the shell and located between the end sections, and the ring of transducers have faces that are exposed to an area exterior of the single body, and
  wherein the single body is untethered.

2. An intelligent pig according to claim 1, in which the single body has a cylindrical body.

3. An intelligent pig according to claim 1, wherein the two end sections include compartments for electronics.

4. An intelligent pig according to claim 1, further comprising a humidity sensor that monitors internal humidity of the single body.

5. An intelligent pig according to claim 1, further comprising one or more external rings to centralise the pig within the tube or pipe.

6. An intelligent pig according to claim 1, wherein the end sections of the pig allow for attachment to different nose cones.

7. The intelligent pig according to claim 1, wherein the ring of transducers are sealed within the single body by a sealing flange that prevents fluid from entering the single body of the intelligent pig.

8. An intelligent pig according to claim 2, wherein the cylindrical body is symmetrical and each of the end sections are provided with a nose cone.

9. An intelligent pig according to claim 2, wherein the single body includes carbon fiber.

10. An intelligent pig according to claim 2, wherein the single body includes a para-aramid synthetic fiber.

11. The intelligent pig according to claim 3, wherein the electronics are a circuit board containing circuitry and accelerometers.

12. An intelligent pig according to claim 5, wherein the rings comprise an inner solid section provided with protuberances that extend to the interior of the pipe and provide spaces for flow of a driving fluid.

13. An intelligent pig according to claim 5, wherein brushes are employed at an exterior of the rings.

14. An intelligent pig according to claim 5, wherein the one or more external rings are symmetrically located along the single body.

15. An intelligent pig according to claim 5, wherein the one or more external rings include inner rings and outer rings having bristles.

16. An intelligent pig comprising:
a. a cylindrical single body comprising:
  i. a shell having two end sections that create the single body;
  ii. a transmitter located within the single body, the transmitter emitting signals;
  iii. a receiver located within the single body, wherein the receiver receives signals from the transmitter so that the transmitter and the receiver monitor an interior of a tube or a pipe;
  iv. a power supply located within the single body; and
  v. inner rings and outer rings provided around a cylindrical section of the cylindrical body, wherein the inner rings and the outer rings are provided with bristles and the bristles of the inner rings are shorter than the bristles of the outer rings;
wherein the transmitter includes a ring of transducers that are sealed within an interior portion of the shell and located between the end sections, and the ring of transducers have faces that are exposed to an area exterior of the single body, and
wherein the single body is untethered.

17. The intelligent pig according to claim 16, wherein the ring of transducers are sealed within the single body by a sealing flange that prevents fluid from entering the single body of the intelligent pig.

18. An intelligent pig according to claim 16, wherein the two end sections include compartments for electronics.

19. The intelligent pig according to claim 18, wherein the electronics are a circuit board containing circuitry and accelerometers.

20. An intelligent pig according to claim 19, in which the end sections of the pig allow for attachment to different nose cones and the single body includes a para-aramid synthetic fiber.

\* \* \* \* \*

UNITED STATES PATENT AND TRADEMARK OFFICE
CERTIFICATE OF CORRECTION

PATENT NO. : 8,894,772 B2  
APPLICATION NO. : 13/866395  
DATED : November 25, 2014  
INVENTOR(S) : John Phipps Page 1 of 1

It is certified that error appears in the above-identified patent and that said Letters Patent is hereby corrected as shown below:

On the Title page, under item (73) Assignee "Cokebuster" should be "Cokebusters"

Signed and Sealed this  
Twenty-first Day of April, 2015

Michelle K. Lee  
*Director of the United States Patent and Trademark Office*